United States Patent [19]
Kim et al.

[11] Patent Number: 5,760,947
[45] Date of Patent: Jun. 2, 1998

[54] THIN FILM ACTUATED MIRROR ARRAY FOR USE IN AN OPTICAL PROJECTION SYSTEM AND METHOD FOR THE MANUFACTURE THEREOF

[75] Inventors: Dong-Kuk Kim; Jeong-Beom Ji; Yong-Ki Min, all of Seoul, Rep. of Korea

[73] Assignee: Daewoo Electronics Co., Ltd., Seoul, Rep. of Korea

[21] Appl. No.: 336,021

[22] Filed: Nov. 8, 1994

[30] Foreign Application Priority Data

Nov. 9, 1993 [KR] Rep. of Korea ............... 1993-23725
Nov. 9, 1993 [KR] Rep. of Korea ............... 1993-23726
Nov. 30, 1993 [KR] Rep. of Korea ............... 1993-25877

[51] Int. Cl.$^6$ .................................. G02B 26/00
[52] U.S. Cl. .................... 359/291; 359/295; 359/846; 359/848; 359/224; 310/328
[58] Field of Search .......................... 359/290, 291, 359/292, 295, 846, 848, 850, 855, 224, 226, 230; 310/328, 333, 366

[56] References Cited

U.S. PATENT DOCUMENTS

| | | |
|---|---|---|
| 3,544,201 | 12/1970 | Fowler et al. |
| 4,280,756 | 7/1981 | Albertinetti ............... 359/295 |
| 4,529,620 | 7/1985 | Glenn. |
| 5,035,475 | 7/1991 | Lee et al. |
| 5,085,497 | 2/1992 | Um et al. ............... 359/848 |
| 5,159,225 | 10/1992 | Um ............... 310/328 |
| 5,247,222 | 9/1993 | Engle ............... 310/328 |
| 5,469,302 | 11/1995 | Lim ............... 359/846 |
| 5,481,396 | 1/1996 | Ji et al. ............... 359/295 |
| 5,506,720 | 4/1996 | Yoon ............... 359/224 |

FOREIGN PATENT DOCUMENTS

| | | |
|---|---|---|
| 0069226 | 1/1983 | European Pat. Off. |
| 0419853 | 4/1991 | European Pat. Off. |
| 9109503 | 6/1991 | WIPO . |
| 9308501 | 4/1993 | WIPO . |

*Primary Examiner*—Loha Ben
*Attorney, Agent, or Firm*—Cushman Darby & Cushman Intellectual Property Group of Pillsbury Madison & Sutro, LLP

[57] ABSTRACT

An array of M×N thin film actuated mirrors for use in an optical projection system comprises an active matrix, an array of M×N thin film actuating structures, each of the thin film actuating structures including at least a thin film layer of a motion-inducing material, a pair of electrodes, each of the electrodes being provided on top and bottom of the thin film motion-inducing layer, an array of M×N supporting members, each of the supporting members being used for holding each of the actuating structures in place by cantilevering each of the actuating structures and also for electrically connecting each of the actuating structures and the active matrix, an array of M×N spacer members, each of the spacer members being mounted on the top surface of each of the actuating structures at the distal end thereof, and an array of M×N mirror layers for reflecting light beams, each of the mirror layers being secured on each of the spacer members of the actuating structures. An electrical signal is applied across the thin film layer of the motion-inducing material located between the pair of electrodes in each of the actuating structures, causing a deformation thereof, which will in turn tilt the mirror layer secured on the spacer member thereof.

35 Claims, 15 Drawing Sheets

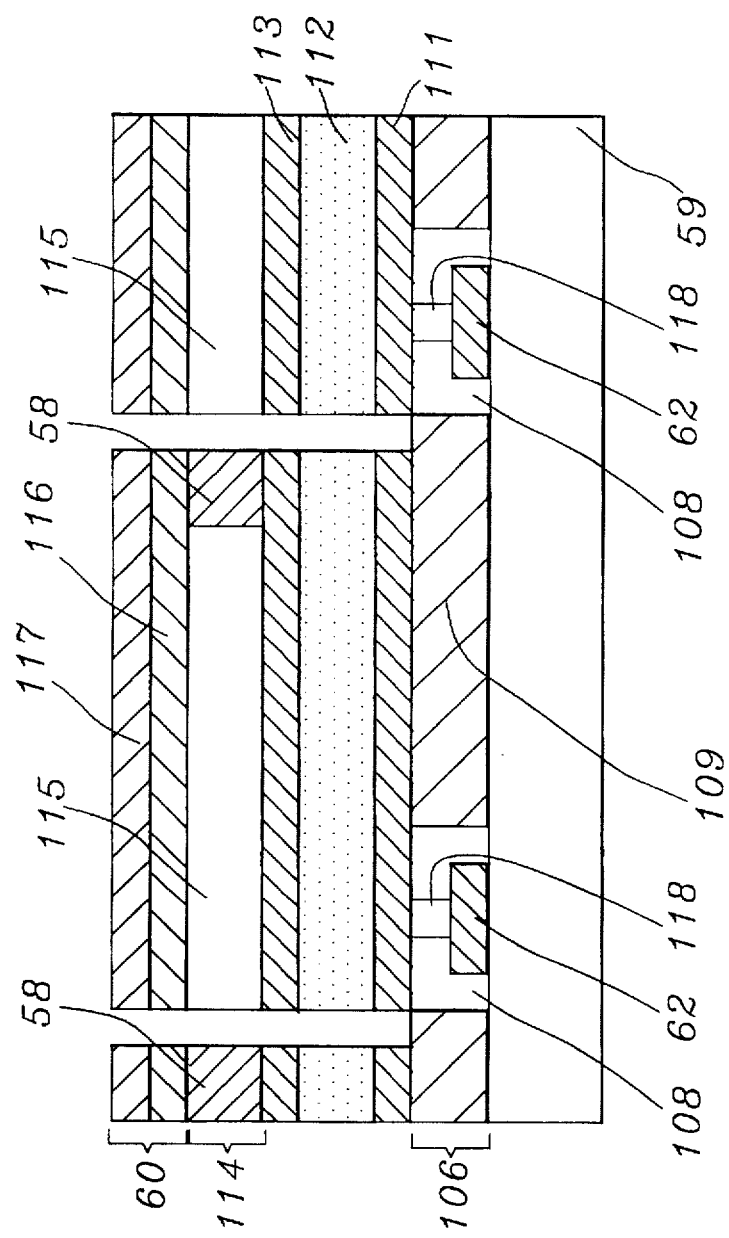

THIN FILM ACTUATED MIRROR ARRAY FOR USE IN AN OPTICAL PROJECTION SYSTEM AND METHOD FOR THE MANUFACTURE THEREOF

FIELD OF THE INVENTION

The present invention relates to an optical projection system; and, more particularly, to an array of M×N thin film actuated mirrors for use in the system and method for the manufacture thereof.

DESCRIPTION OF THE PRIOR ART

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an M×N electrodisplacive actuated mirror array 10 for use in an optical projection system, disclosed in a copending commonly owned application, U.S. Ser. No. 08/278,472, entitled "ELECTRODISPLACIVE ACTUATED MIRROR ARRAY", comprising: an active matrix 11 including a substrate 12 and, an array of M×N transistors thereon; an array 13 of M×N electrodisplacive actuators 30, each of the electrodisplacive actuators 30 including a pair of actuating members 14, 15, a pair of bias electrodes 16, 17, and a common signal electrode 18; an array 19 of M×N hinges 31, each of the hinges 31 fitted in each of the electrodisplacive actuators 30; an array 20 of M×N connecting terminals 22, each of the connecting terminals 22 being used for electrically connecting each of the signal electrodes 18 with the active matrix 11; and an array 21 of M×N mirrors 23, each of the mirrors 23 being mounted on top of each of the M×N hinges 31.

In the above mentioned copending, commonly owned application, there is also disclosed a method for manufacturing such an array of M×N electrodisplacive actuated mirrors, employing a ceramic wafer having a thickness of 30 to 50 μm.

There is room for further improvements over the above described method for manufacturing an array of M×N electrodisplacive actuators, however. First of all, it is rather difficult to obtain a ceramic wafer having a thickness of 30 to 50 μm; and, furthermore, once the thickness of the ceramic wafer is reduced to a 30 to 50 μm range, the mechanical properties thereof are likely to degrade which may, in turn, make it difficult to carry out the manufacturing process.

In addition, it involves a number of time consuming, hard to control, and tedious processes, thereby making it difficult to obtain the desired reproducibility, reliability and yield; and, furthermore, there may be a limit to the down sizing thereof.

SUMMARY OF THE INVENTION

It is, therefore, a primary object of the present invention is to provide a method for manufacturing an array of M×N actuated mirrors, which dispenses with the use of a thin electrodisplacive ceramic wafer.

It is another object of the present invention to provide an improved and novel method for manufacturing an array of M×N actuated mirrors which will give higher reproducibility, reliability and yield by utilizing the known thin film techniques commonly employed in the manufacture of semiconductors.

It is a further object of the present invention to provide an array of M×N actuated mirrors having a novel structure, incorporating a plurality of thin film layers of a motion-inducing, an electrically conducting and a light reflecting materials.

In accordance with one aspect of the present invention, there is provided an array of M×N thin film actuated mirrors for use in an optical projection system, the array comprising: an active matrix including a substrate, an array of M×N transistors and an array of M×N connecting terminals; an array of M×N thin film actuating structures, each of the actuating structures being provided with a top and a bottom surfaces, a proximal and a distal ends, each of the actuating structures including at least a thin film layer of a motion-inducing material having a top and bottom surfaces, and a first and a second electrodes with the first electrode being placed on the top surface of the motion-inducing layer and the second electrode, on the bottom surface of the motion-inducing layer, wherein an electrical signal applied across the motion-inducing layer between the first and second electrodes causes a deformation of the motion-inducing layer, and hence the actuating structure; an array of M×N supporting members, each of the supporting members being provided with a top and a bottom surfaces, wherein each of the supporting members is used for holding each of the actuating structures in place and also electrically connecting each of the actuating structures and the active matrix; an array of M×N spacer members, each of the spacer members being provided with a top and a bottom surfaces and being disposed on the top surface of each of the actuating structures at the distal end thereof; and an array of M×N mirror layers, each of the mirror layers including a mirror for reflecting light beams and a supporting layer, each of the mirror layers further including a first and a second portions corresponding to the distal and proximal ends of each of the actuating structures, the first and second portions of each of the mirror layers being secured on the top surface of each of the spacer members and being cantilevered from the corresponding supporting member, respectively, such that when each of the actuating structures deforms in response to the electrical signal, the corresponding mirror layer remains planar, thereby allowing all of the mirror thereof to reflect light beams.

In accordance with another aspect of the present invention, there is provided a novel method for manufacturing an array of M×N actuated mirrors for use in an optical projection system, utilizing the known thin film techniques, the method comprising the steps of: (a) providing an active matrix having a top and a bottom surfaces, the active matrix including a substrate, an array of M×N transistors and an array of M×N connecting terminals; (b) forming a first supporting layer on the top surface of the active matrix, the first supporting layer including an array of M×N pedestals corresponding to the array of M×N supporting members in the array of M×N thin film actuated mirrors and a first sacrificial area; (c) treating the first sacrificial area of the first supporting layer to be removable; (d) depositing a first thin film electrode layer on the first supporting layer; (e) providing a thin film motion-inducing layer on the first thin film electrode layer; (f) forming a second thin film electrode layer on the thin film motion-inducing layer; (g) providing a spacer layer on top of the second thin film electrode layer, the spacer layer including an array of M×N spacer members and a second sacrificial area; (h) treating the second sacrificial area of the spacer layer to be removable; (i) depositing a second supporting layer on top of the spacer layer; (j) forming a light reflecting layer on top of the supporting layer; and (k) removing the first and second sacrificial areas of the first supporting layer and the spacer layer to thereby form said array of M×N thin actuated mirrors.

BRIEF DESCRIPTION OF THE DRAWINGS

The above and other objects and features of the present invention will become apparent from the following description of preferred embodiments given in conjunction with the accompanying drawings, wherein:

FIGS. 10A to 10H reproduce schematic cross sectional views setting forth the manufacturing steps for the first embodiment in accordance with the present invention.

DETAILED DESCRIPTION OF THE PREFERRED EMBODIMENTS

Figure 1:
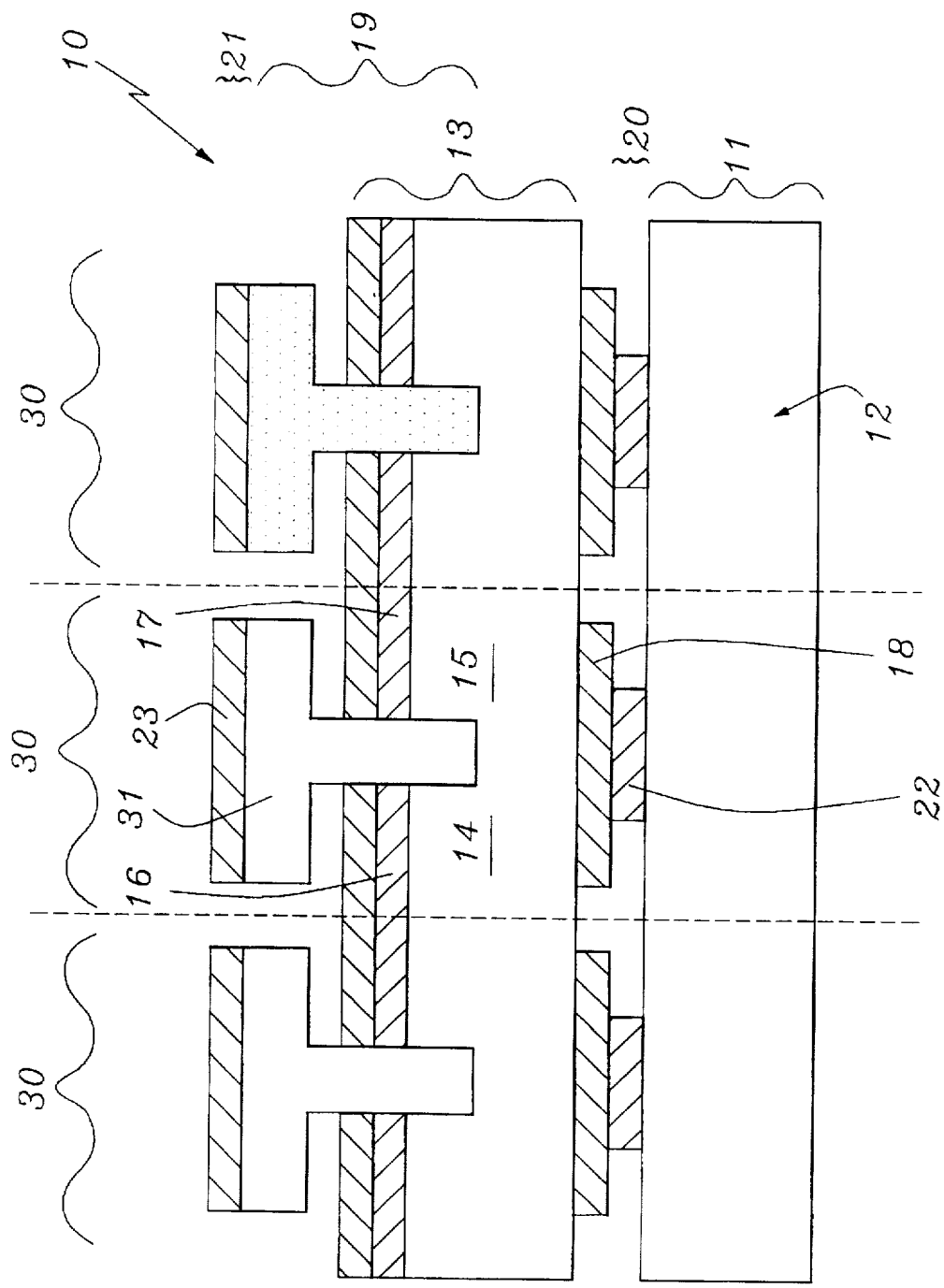
FIG. 1 shows a cross sectional view of an array of M×N electrodisplacive actuated mirrors previously disclosed.

Referring now to FIGS. 2 to 10, there are provided schematic cross sectional views of the inventive array of M×N thin film actuated mirrors for use in an optical projection system and method for the manufacture thereof, wherein M and N are integers, in accordance with preferred embodiments of the present invention. It should be noted that like parts appearing in FIGS. 2 to 10 are represented by like reference numerals.

Figure 2:
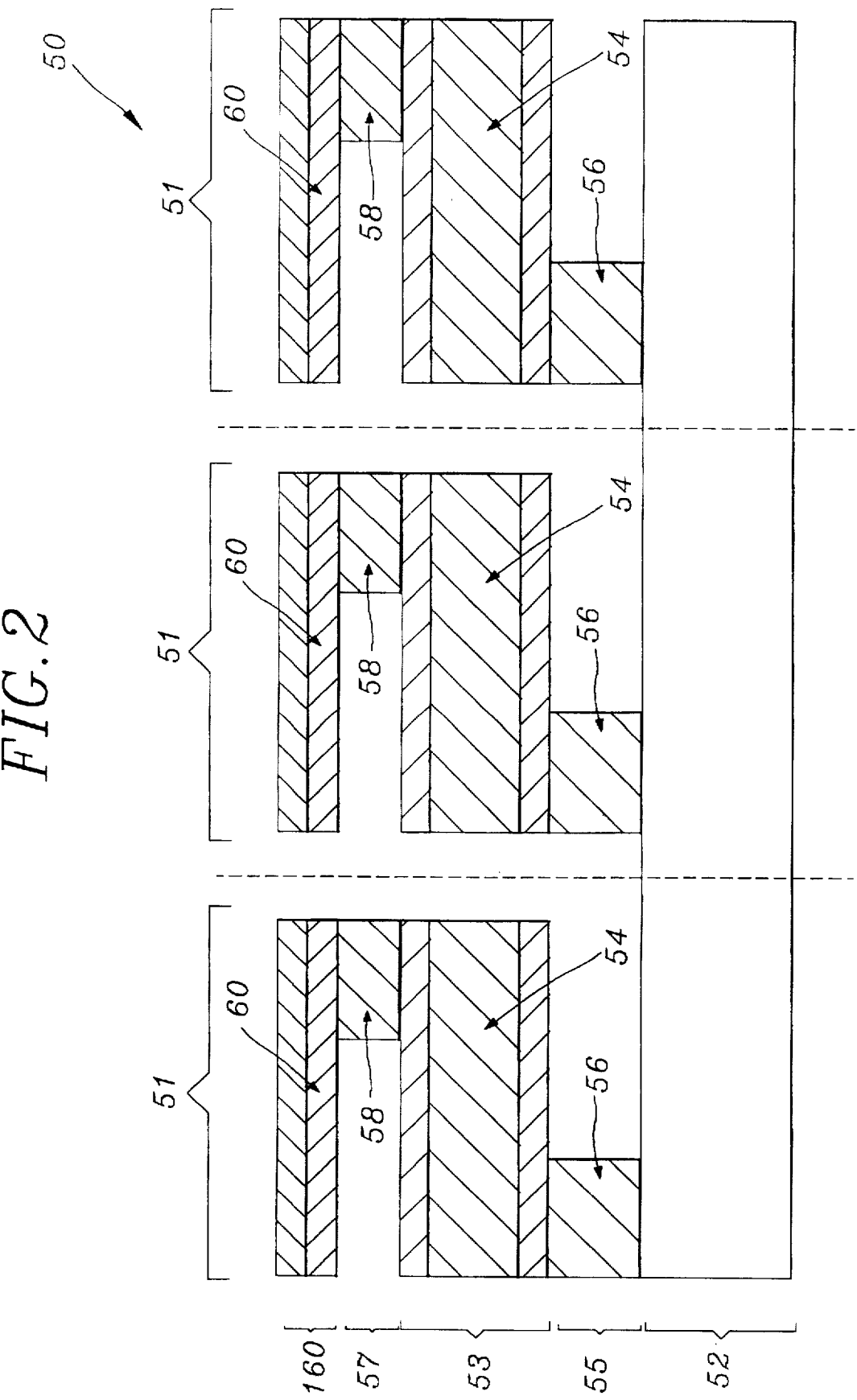
FIG. 2 represents a cross sectional view of an array of M×N thin film actuated mirrors is accordance with the first preferred embodiment of the present invention.

In FIG. 2, there is illustrated a cross sectional view of a first embodiment of an array 50 of M×N thin film actuated mirrors 51, comprising an active matrix 52, an array 53 of M×N thin film actuating structures 54, an array 55 of M×N supporting members 56, an array 57 of M×N spacer members 58 and an array 160 of M×N mirror layers 60.

Figure 3:
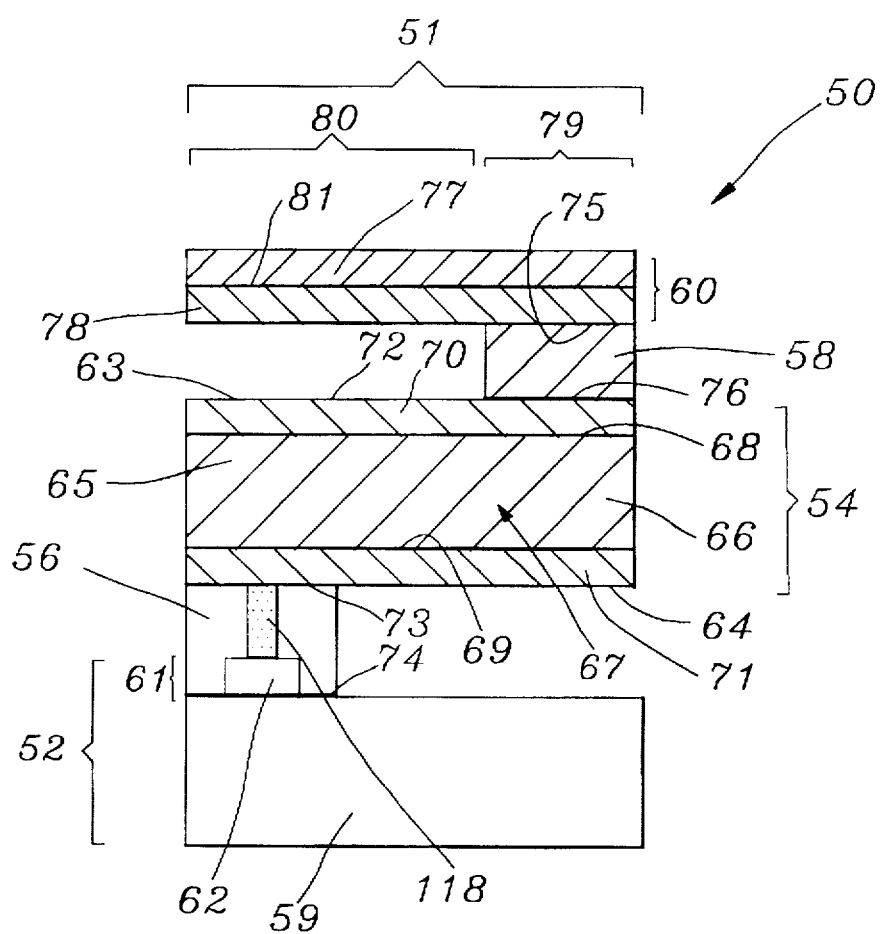
FIG. 3 illustrates a detailed cross sectional view of the inventive thin film actuated mirror array of the first embodiment, shown in FIG. 2.

FIG. 3 represents a detailed cross sectional view of the thin film actuated mirror array 50 shown in FIG. 2. The active matrix 52 includes a substrate 59, an array of M×N transistors (not shown) and an array 61 of M×N connecting terminals 62. Each of the actuating structures 54 is provided with a top and a bottom surfaces 63, 64, a proximal and a distal ends, 65, 66, and further includes at least a thin film layer 67 of a motion inducing material having a top and a bottom surfaces 68, 69 and a first and second electrodes 70, 71, made of, e.g., a metal such as gold (Au) or silver (Ag), the first electrode 70 having a top surface 72. The first electrode 70 is placed on the top surface 68 of the motion-inducing thin film layer 67 and the second electrode 71, on the bottom surface 69 thereof. The motion-inducing thin film layer 67 is made of a piezoelectric ceramic, an electrostrictive ceramic, a magnetrostrictive ceramic or a piezoelectric polymer. In the case when the motion-inducing thin film layer 67 is made of a piezoelectric ceramic or a piezoelectric polymer, it must be poled.

Each of the M×N supporting members 56, provided with a top and bottom surfaces 73, 74, is used for holding each of the actuating structures 54 in place and also for electrically connecting the second electrode 71 in each of the actuating structures 54 with the corresponding connecting terminals 62 on the active matrix 52 by being provided with a conduit 118 made of an electrically conductive material, e.g., a metal. In this inventive array 50 of M×N thin film actuated mirrors 51, each of the actuating structures 54 is cantilevered from each of the supporting members 56 by being mounted on the top surface 73 of each of the supporting members 56 at the bottom surface 64 of each of the actuating structures 54 at the proximal end 65 thereof, and the bottom surface 74 of each of the supporting members 56 is placed on top of the active matrix 52. Each of the spacer members 58, provided with a top and a bottom surfaces 75, 76, is placed on the top surface 63 of each of the actuating structures 54 at the distal end 66 thereof. Furthermore, each of the mirror layers 60, including a mirror 77 for reflecting light beams, a supporting layer 78, having a top surface 81, a first and a second portions 79, 80 corresponding to the distal and proximal ends 66, 65 of each of the actuating structures 54, respectively, wherein the first portion 79 of each of the mirror layers 60 secured to the top surface 75 of each of spacer members 58 and the second portion 80 is cantilevered from each of the supporting members 56. In each of the mirror layers 60, the mirror 77 is placed on the top surface 81 of the supporting layer 78.

An electrical field is applied across the motion-inducing thin film layer 67 between the first and second electrodes 70, 71 in each of the actuating structures 54. The application of such an electric field will cause a deformation of the motion-inducing layer 67, hence the actuating structure 54, which will, in turn, tilt the mirror layer 60.

Figure 4:
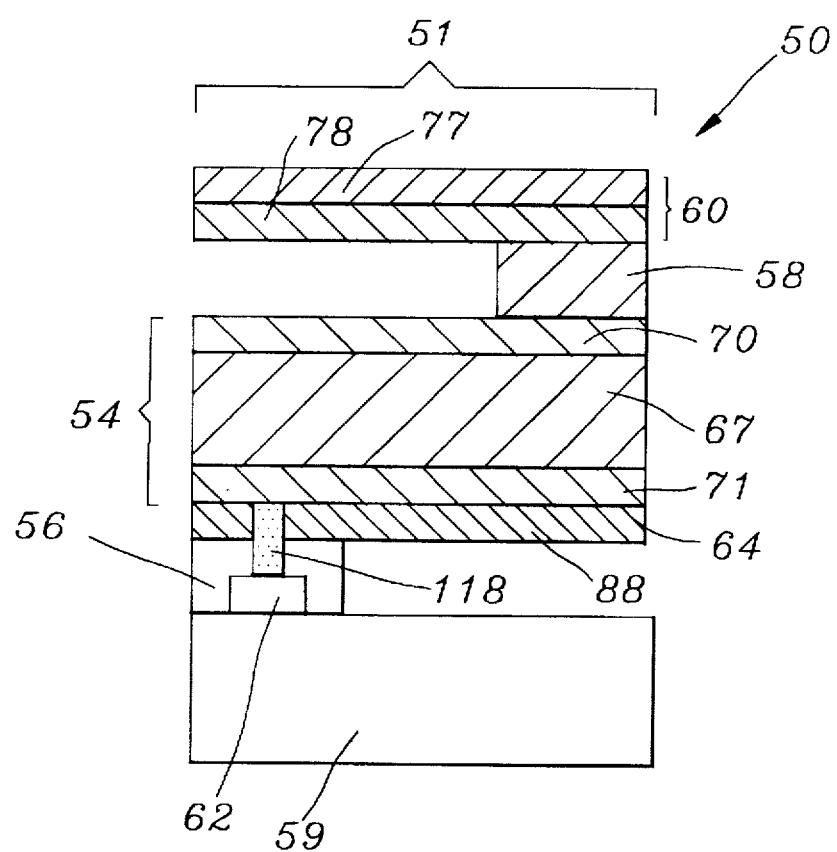
FIG. 4 depicts a cross sectional view of a thin film actuated mirror of the first embodiment with an elastic layer placed on bottom of the second electrode.

In addition, each of the thin film actuated mirrors 51 can be further provided with an elastic layer 88. The elastic layer 88 can be placed either intermediate the spacer member 58 and the first electrode 70 or on bottom of the second electrode 71 in each of the actuated mirrors 51. There is shown in FIG. 4 a thin film actuated mirror 51 provided with an elastic layer 88 on the bottom surface 64 of the actuating structure 54.

Figure 5:
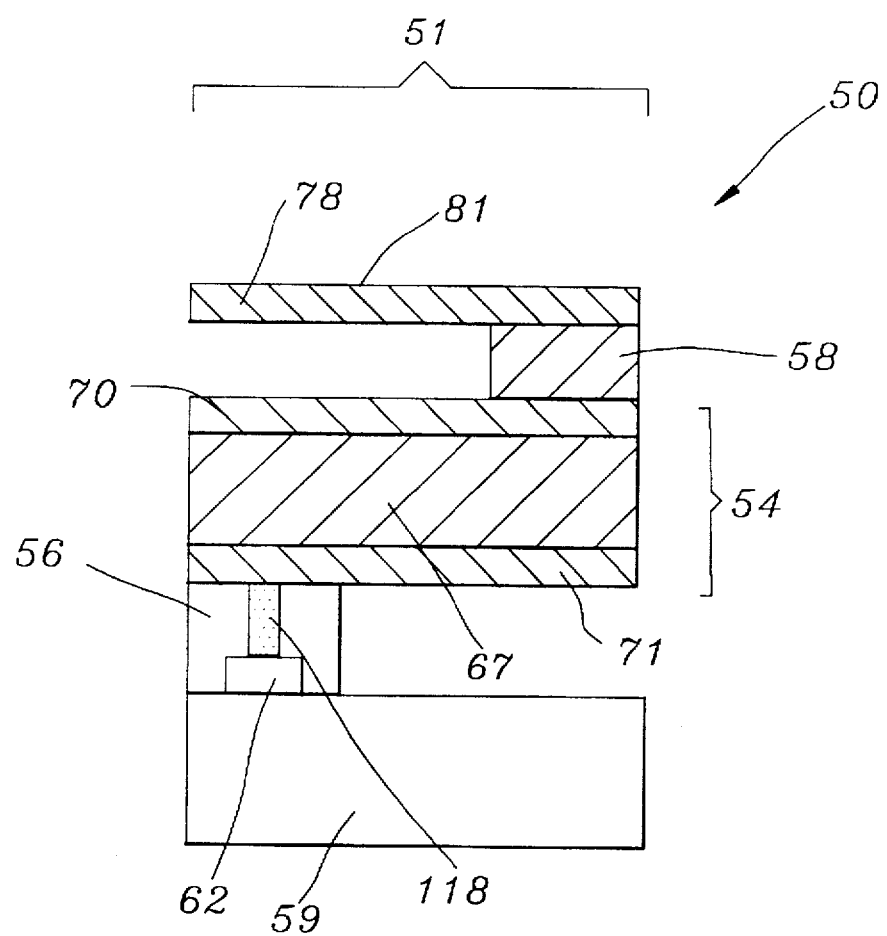
FIG. 5 presents a cross sectional view of a thin film actuated mirror of the first embodiment having the supporting layer made of a light reflecting material.

The material making up the supporting layer 78 in each of the mirror layers 60 can be also light reflecting, e.g., aluminum (Al), which will allow the top surface 81 thereof to function also as the mirror 77 in each of the thin film actuated mirrors 51, as depicted in FIG. 5.

Figure 6A:
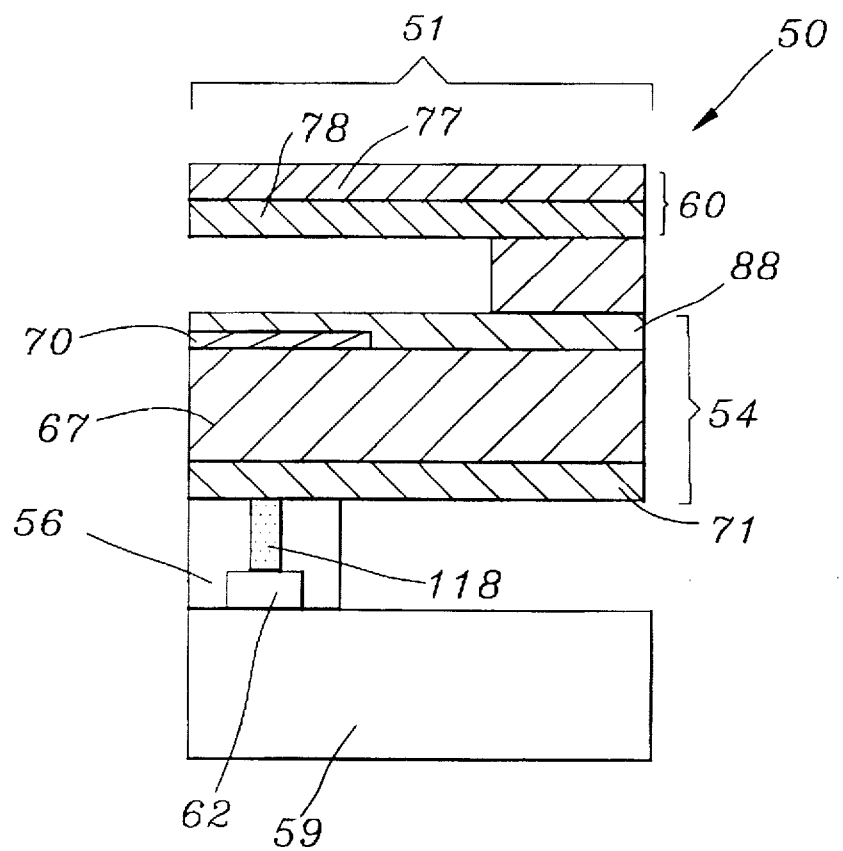
FIGS. 6A and 6B demonstrate a cross sectional view of a thin film actuated mirror of the first embodiment having either one of the top and bottom surfaces of the motion-inducing layer in each of the actuating structure covered partially with the first and second electrodes.
Figure 6B:
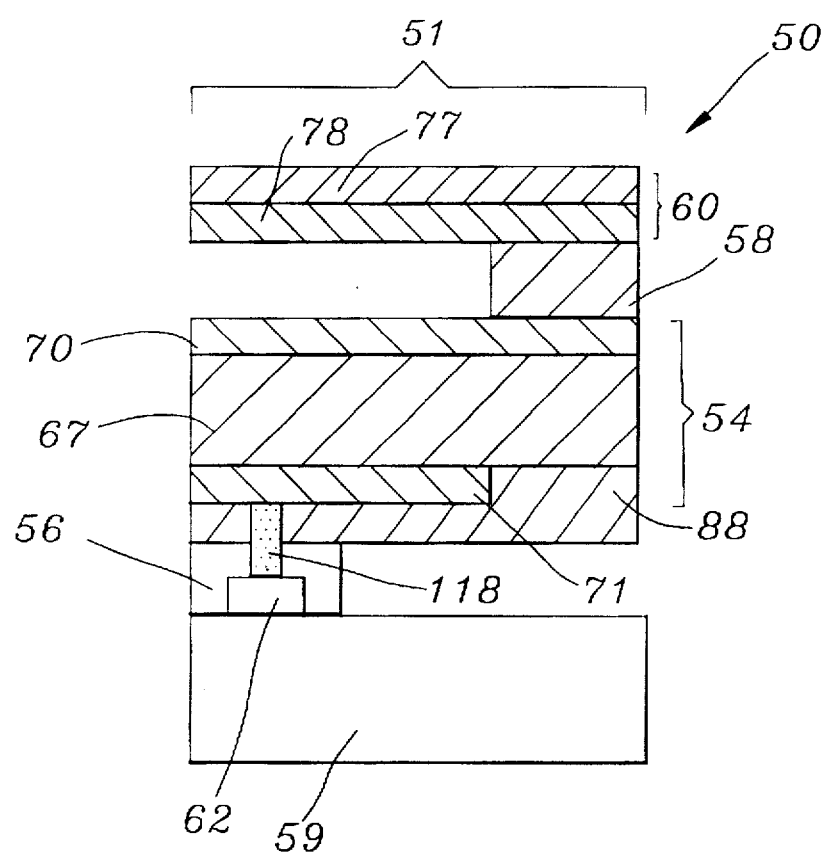

It is possible for the inventive array 50 of thin film actuated mirrors 51 to function equally well by having the top and bottom surfaces 68, 69 of the motion-inducing thin film layer 67 in each of the actuating structures 54 covered completely with the first and second electrodes 70, 71 or by having either one of the top and bottom surfaces 68, 69 of the motion-inducing thin film layer 67 in each of the actuating structures 54 covered partially with the first and second electrodes 70, 71. In this case the thin film actuated mirror 51 must be provided with an elastic layer 88. Two examples of the thin film actuated mirror 51 having such a structure are illustrated in FIGS. 6A and 6B.

Figure 7:
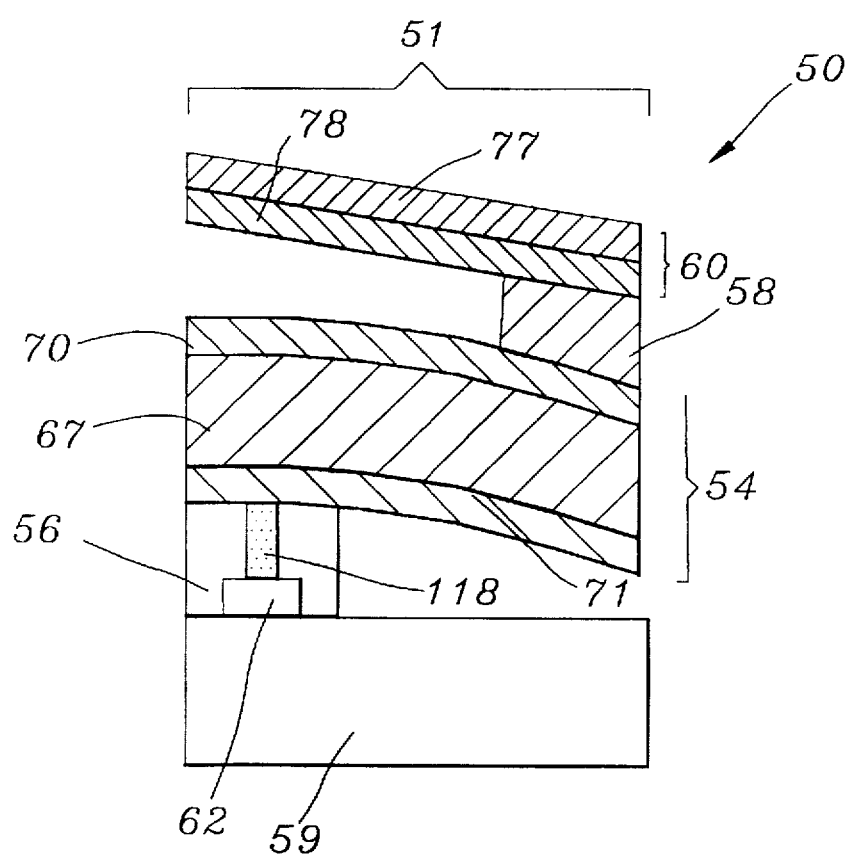
FIG. 7 discloses a cross sectional view of a thin film actuated mirror of the first embodiment in an actuated state.

By way of example of the first embodiment, there are illustrated is FIGS. 3 and 7 an array 50 of M×N thin film actuated mirrors 51 comprising an array of M×N actuating structures 54, made of a piezoelectric ceramic, e.g., lead zirconium titanate(PZT). An electric field is applied across the motion-inducing thin film piezoelectric layer 67 located between the first and second electrodes 70, 71 in each of the actuating structures 54. The application of the electric field will either cause the piezoelectric ceramic to contract or expand, depending on the polarity of the electric field with respect to the poling of the piezoelectric material. If the polarity of the electric field corresponds to the polarity of the piezoelectric ceramic, the piezoelectric ceramic will contract. If the polarity of the electric field is opposite the polarity of the piezoelectric ceramic, the piezoelectric ceramic will expand.

In FIG. 7, the polarity of the piezoelectric ceramic corresponds to the polarity of the applied electric field, causing the piezoelectric ceramic to contract. In such a case, the actuating structure 54 bends downward, as shown in FIG. 7, thereby tilting the mirror layer 60 downward at an angle. The mirror layer 60, however, remains planar, and as a result, the effective length of the mirror layer 60 is the entire length of the mirror layer 60. In comparison, if the mirror layer 60 is directly secured to the actuating structure 54, the portion of the mirror layer 60 secured to the supporting member 56 does not deform in reaction to the electric field, but remains securely in place. As a result, the effective length of the mirror layer 60 is equal to a length less the length of the portion of the actuating structure 54 secured to the supporting member 56. The implementation of the spacer member 58 and the mirror layer 60 in the embodiment shown in FIG. 3, therefore, increase the fill factor and efficiency of the mirror array. Referring now to FIGS. 3 and 7, it can be shown that the light impinging on the mirror layer 60, of the actuated mirror 51 shown in FIG. 7 is deflected at a larger angle than the light reflected from of the unactuated actuated mirror 51 shown in FIG. 3.

Alternatively, an electric field of a reverse polarity may be applied across the motion-inducing thin film piezoelectric layer 67, causing the piezoelectric ceramic to expand. In this example, the actuating structure 54 bends upward(not shown). The light impinging the mirror layer 60 of the upwardly actuated mirror 51 is deflected at a smaller angle than the light deflected from the unactuated actuated mirror 51 shown in FIG. 3.

Figure 8:
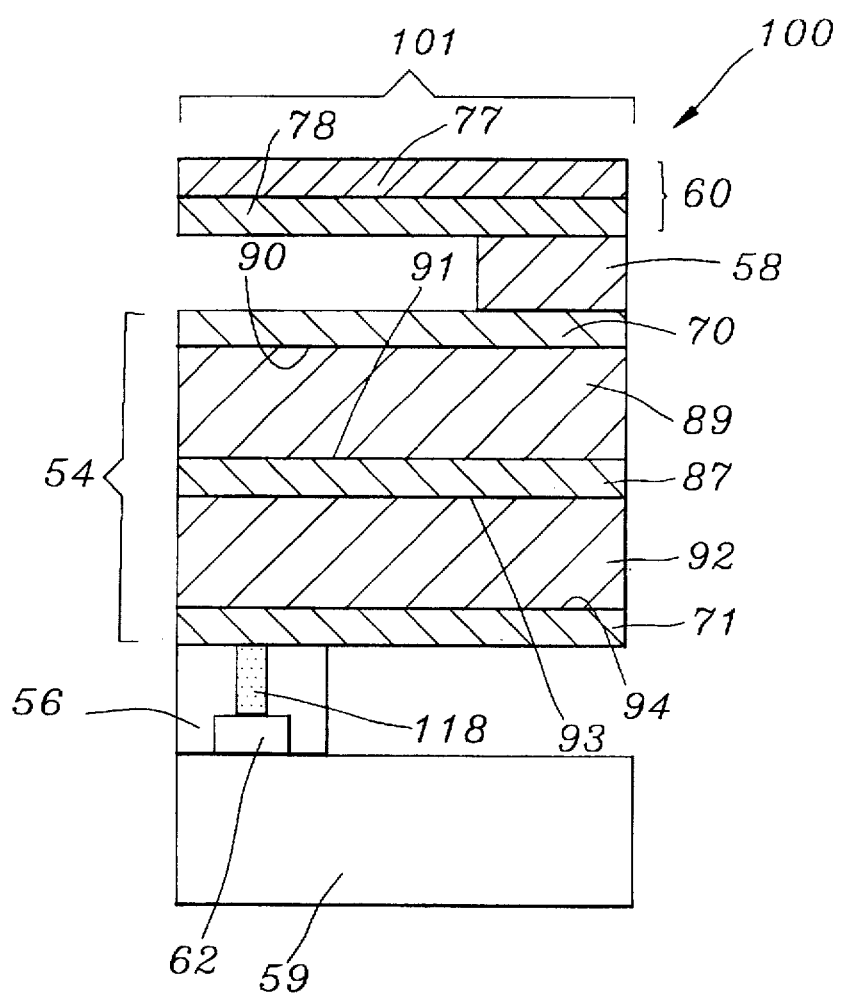
FIG. 8 provides a cross sectional view of a thin film actuated mirror of the second embodiment having a bimorph structure.

There is shown in FIG. 8 a cross sectional view of a second embodiment of an array 100 of M×N thin film actuated mirrors 101, wherein the second embodiment is similar to the first embodiment except that each of the actuating structures 54 is of a bimorph structure, including a first electrode 70, a second electrode 71, an intermediate metal layers 87 an upper motion-inducing thin film layer 89 having a top and a bottom surfaces 90, 91 and a lower motion-inducing thin film layer 92 provided with a top and bottom surfaces 93, 94. In each of the actuating structures 54, the upper and lower motion-inducing thin film layers 89,92 are separated by the intermediate metal layer 87, the first electrode 70 placed on the top surface 90 of the upper motion-inducing thin film layer 89, and the second electrode 71, on the bottom surface 94 of the lower motion-inducing thin film layer 92.

As in the case of the first embodiment, the upper and lower motion-inducing thin film layers 89, 92 in each of the actuating structures 54 are made of a piezoelectric ceramic, an electrostrictive ceramic, a magnetostrictive ceramic or a piezoelectric polymer. In the case when the upper and lower motion-inducing thin film layers 89,92 are made of a piezoelectric ceramic or a piezoelectric polymer, the upper and lower motion-inducing thin film layers 89,92 must be poled in such a way that the polarization direction of piezoelectric material in the upper motion-inducing thin film layer 89 is opposite from that of the lower motion-inducing thin film layer 92.

As an example of how the second embodiment functions, assume that the upper and lower motion-inducing layers 89, 92 in the array 100 of M×N thin film actuated mirrors 101 shown in FIG. 8 are made of a piezoelectric ceramic, e.g., PZT. When an electric field is applied across each of the actuating structures 54, the upper and lower motion-inducing thin film piezoelectric layers 89, 92, of the actuating structure 54 will either bend upward or downward, depending on the poling of the piezoelectric ceramic and the polarity of the electric field. For example, if the polarity causes the upper motion-inducing thin film piezoelectric layer 89 to contract, and the lower motion-inducing thin film piezoelectric layer 92 to expand, the actuating structure 54 will bend upward. In this situation, the impinging light is deflected at a smaller angle from the actuating structure 54 than the deflected light from the unactuated actuating structure 54. However, if the polarity of the piezoelectric ceramic and the electric field causes the upper motion-inducing thin film piezoelectric layer 89 to expand and the lower motion-inducing thin film piezoelectric layer 92 to contract, the actuating structure 54 will bend downward. In this situation, the impinging light is deflected at a larger angle from the actuating structure 54 than the deflected light from the unactuated actuating structure 54.

Figure 9:
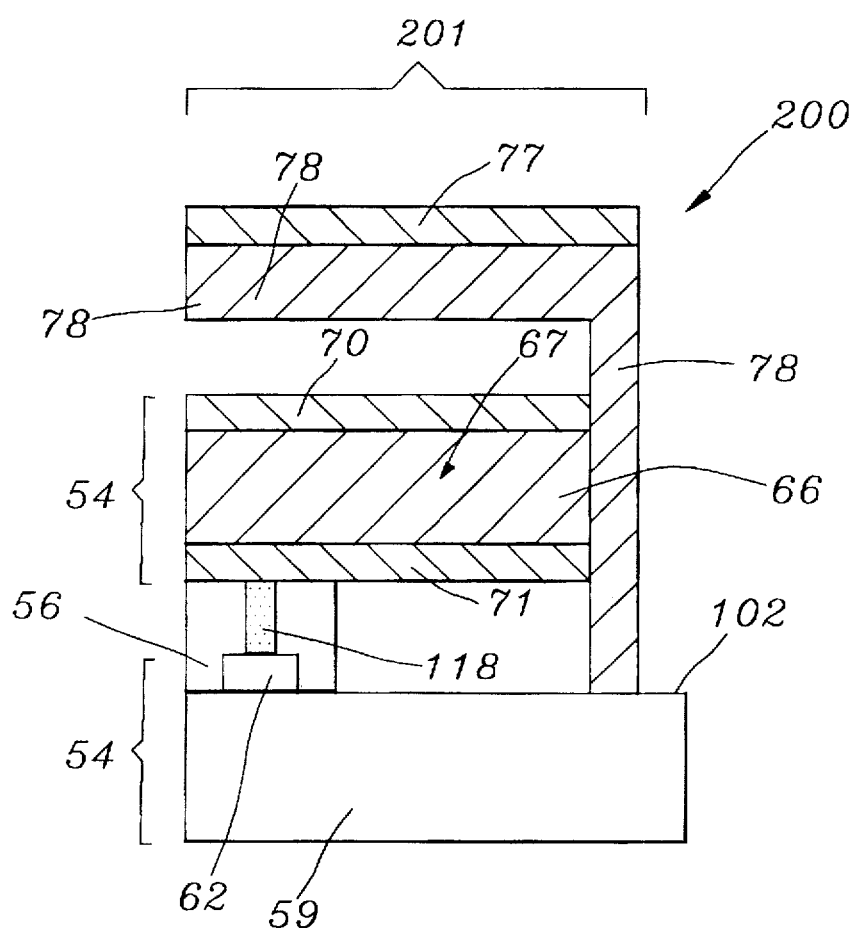
FIG. 9 provides a cross sectional view of a thin film actuated mirror of the third embodiment.

There is illustrated in FIG. 9 a cross sectional view of a third embodiment of an array 200 of M×N thin film actuated mirror 201, wherein the third embodiment is similar to the first embodiment except that the array 57 of M×N spacer members is absent. Instead, in each of the thin film actuated mirrors 51, the supporting layer 78 is simultaneousely connected to the distal end 66 of the actuating structure 54 and to the active matrix 52.

Figure 10A:
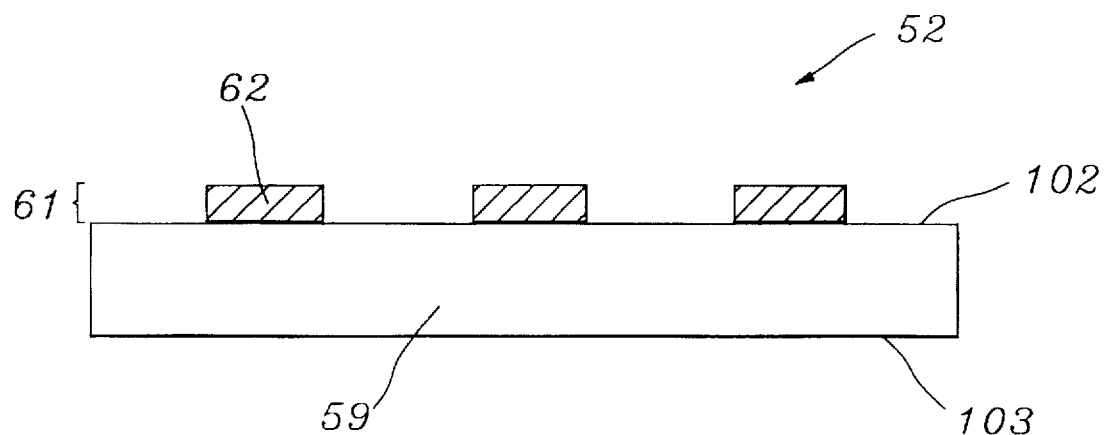
Figure 10B:
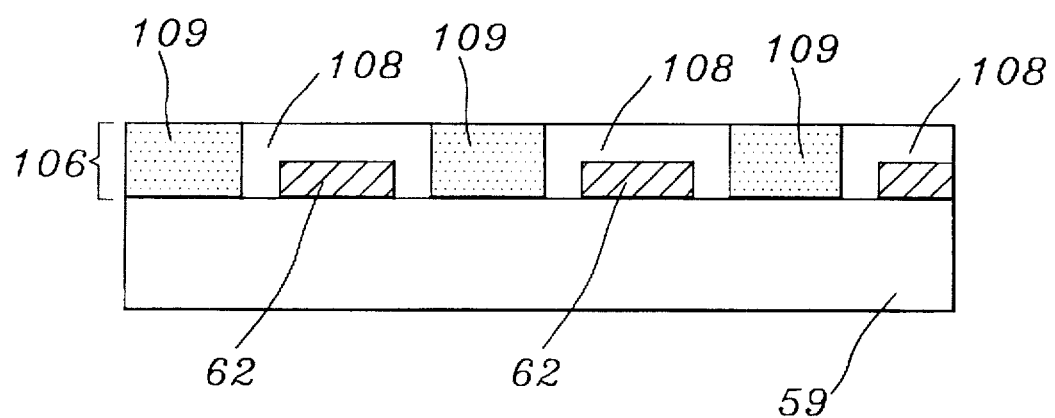

There are illustrated in FIGS. 10A to 10B the manufacturing steps involved in manufacturing of the first embodiment of the present invention. The process for manufacturing the first embodiment, i.e., the array 50 of M×N thin film actuated mirror 51, wherein M×N are integers, begins with the preparation of the active matrix 52, having the top and a bottom surfaces 102, 103, comprising the substrate 59, the array of M×N transistors (not shown) and the array 104 of M×N connecting terminals 105, as illustrated in FIG. 10A.

In the subsequent step, there is formed on the top surface 102 of the active matrix 52 a first supporting layer 106, including an array 107 of M×N pedestals 108 corresponding to the array 55 of M×N supporting members 56 and a first sacrificial area 109, wherein the first supporting layer 106 is formed by: depositing a sacrificial layer (not shown) on the entirety of the top surface 102 of the active matrix 52; forming an array of M×N empty slots (not shown), to thereby generated the first sacrificial area 109, each of the empty slots being located around each of the M×N connecting terminals 62; and providing a pedestal 108 in each of the empty slots, as shown in FIG. 10B. The sacrificial layer is formed by using a sputtering method, the array of empty slots, using an etching method, and the pedestals, using a sputtering or a chemical vapor deposition(CVD) method, followed by an etching method. The sacrificial area 109 of the first supporting layer 106 is then treated so as to be removable later using an etching method or the application of chemicals.

Figure 10C:
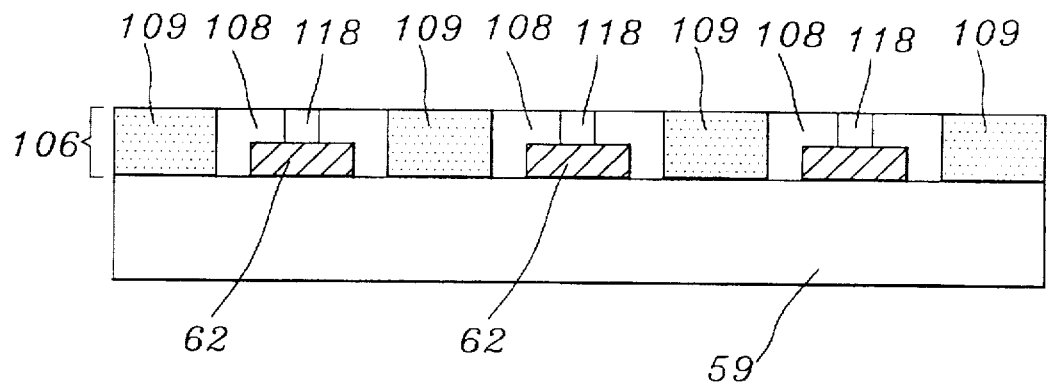

A conduit 118 for electrically connecting each of the connecting terminals 62 with each of the second electrode 71, made of an electrically conductive material, e.g., tungsten(W), is formed in each of the pedestals 108 by first creating a hole extending from top thereof to top of the corresponding connecting terminals 62 using an etching method, followed by filling therein with the electrically conducting material, as depicted in FIG. 10c.

Figure 10D:
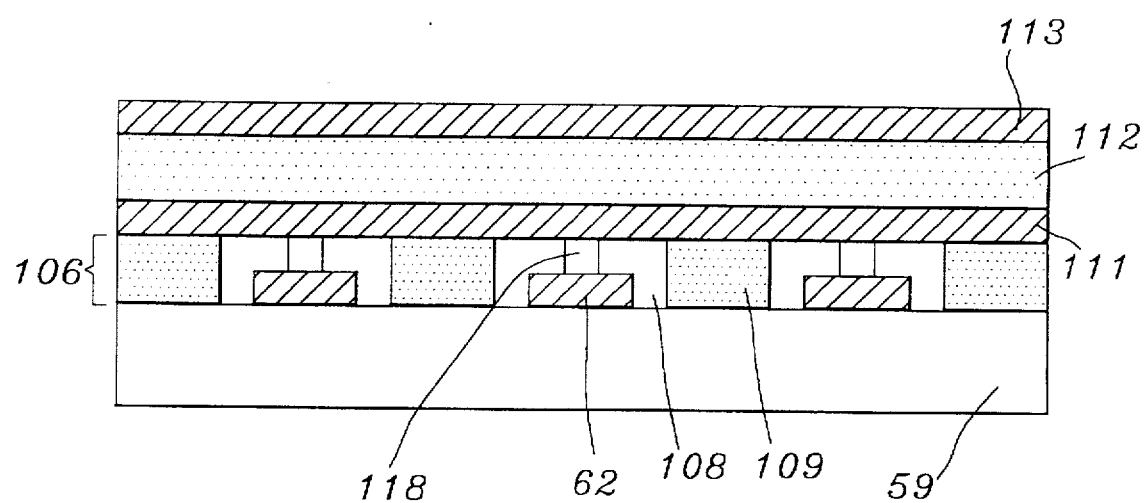

In the subsequent step, as depicted in FIG. 10D, a first thin film electrode layer 111, made of an electrically conducting material, e.g., Au, is deposited on the first supporting layer 106. Thereafter, a thin film motion-inducing layer 112, made of a motion-inducing material, e.g., PZT, and a second thin film electrode layer 113 are then respectively formed on the first thin film electrode layer 111.

Figure 10E:
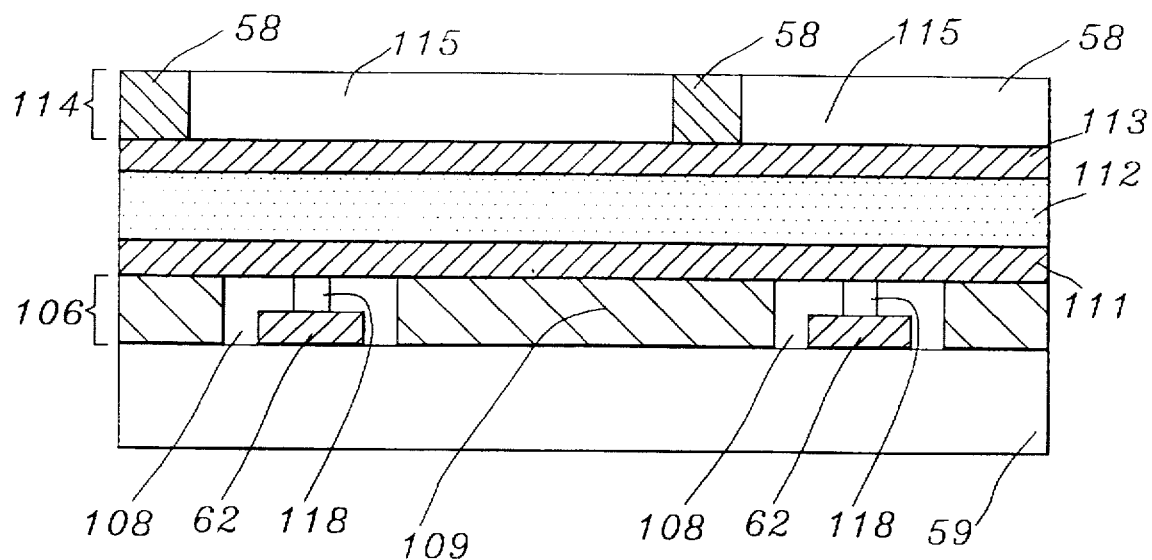

Thereafter, a spacer layer 114 is provided on top of the second thin film electrode layer 113, the spacer layer 114 including the array 57 of M×N spacer members 58 and a second sacrificial area 115, as depicted in FIG. 10E. The method used in forming the spacer layer 114 is similar to the one used in forming the first supporting layer 106. The second sacrificial area 115 of the spacer layer 114 is then treated so as to be removable.

Figure 10F:
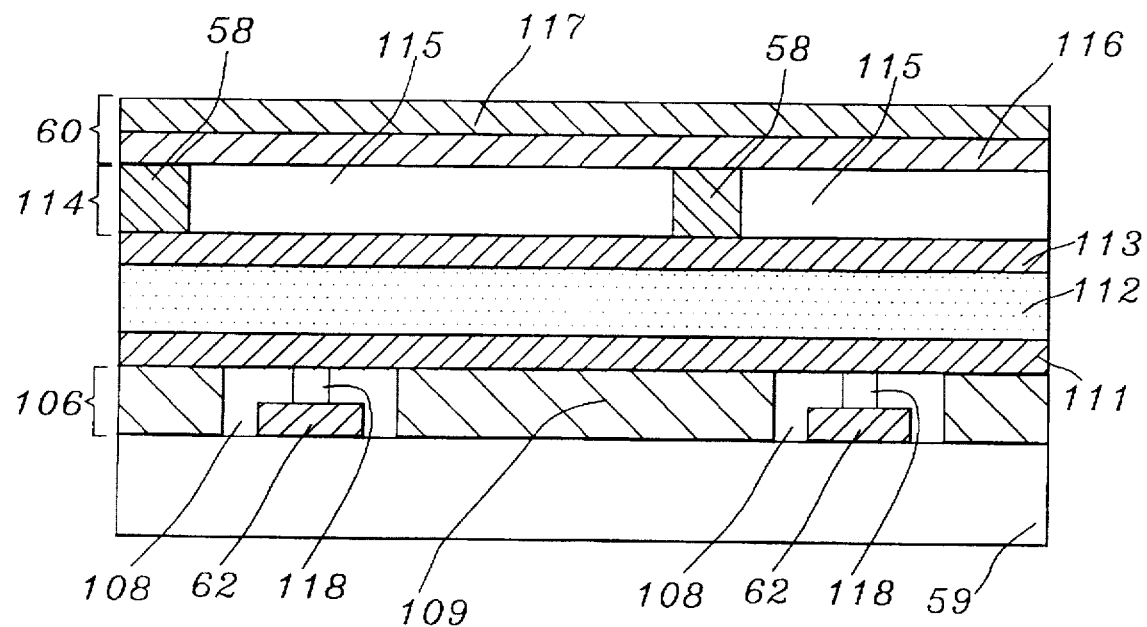

In the subsequent step, a second supporting layer 116 and a light reflecting layer 117 comprising the mirror layer 60 are successively deposited on top of the spacer layer 114, as shown in FIG. 10F.

The thin film layers of the electrically conducting, the motion-inducing, and the light reflecting materials may be deposited and patterned with the known thin film techniques, such as sputtering, sol-gel, evaporation, etching and micro-machining, as shown in FIG. 10G.

Figure 10H:
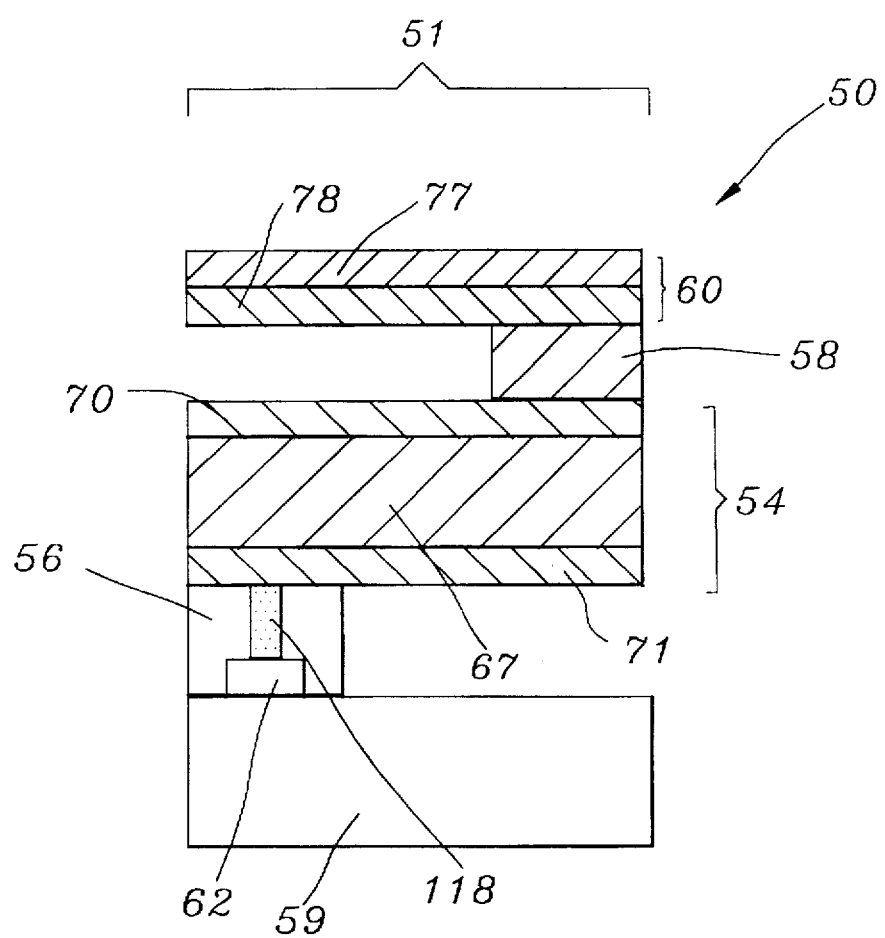

The first and second sacrificial areas 109, 115 of the supporting layer 106 and the spacer layer 114 are then removed or dissolved by the, application of chemical to thereby form said array 50 of M×N thin film actuated mirrors 51, as illustrated in FIG. 10H.

The second embodiment is fabricated in a similar manner as the first embodiment. The first supporting layer is applied to the active matrix. The first supporting layer also includes the array of M×N pedestals corresponding to the array of M×N supporting members and the sacrificial area. The first thin film electrode layer, the lower thin film motion-inducing layer, the intermediate metal layer, the upper thin film motion-inducing layer, and the second thin film electrode layer, are then deposited respectively on the first supporting layer. In the subsequent step, the spacer and mirror layers are successively formed. The thin film layers of an electrically conducting, a motion-inducing and a light reflecting materials are deposited and patterned with the known thin film techniques, as stated earlier. The sacrificial areas of the first supporting and spacer layers are next dissolved or removed by the application of a chemical, leaving the array 100 of thin film actuated mirrors 101, having the array 53 of M×N actuating structures 54 with the bimorph structure.

In the above described methods for manufacturing the first and second embodiments of the present invention, an additional process for forming the elastic layer 88 can be added, involving a similar process as in the forming of other thin film layers.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, comprising:

a substrate including an array of M×N connecting terminals formed on top thereof;

an array of M×N thin film actuating structures, each of the actuating structures being provided with a proximal and a distal ends, each of the actuating structures including at least a thin film layer of a motion-inducing material and a first and a second electrodes with the first electrode being placed on top of the motion-inducing layer and the second electrode, on bottom of the motion-inducing layer, wherein an electrical signal applied across the motion-inducing layer between the first and second electrodes causes a deformation of the motion-inducing layer, and hence the actuating structure;

an array of M×N supporting members, each of the supporting members being located between each of the actuating structures and the substrate, and being used for cantilevering each of the actuating structures;

an array of M×N spacer members, each of the spacer members being disposed on top of each of the actuating structures at the distal end thereof; and an array of M×N mirror layers, each of the mirror layers including a first and a second portions corresponding to the distal and proximal ends of each of the actuating structures, the first portion of each of the mirror layers being secured on top of each of the spacer members, respectively, such that when each of the actuating structures deforms in response to the electrical signal, the corresponding mirror layer remains planar, thereby allowing all of the mirror thereof to reflect light beams.

2. The actuated mirror array of claim 1, wherein each of the actuating structures is cantilevered from each of the supporting members by being mounted on top of each of the supporting members at bottom of each of the actuating structures at the proximal end thereof.

3. The actuated mirror array of claim 1, wherein each of the mirror layers is cantilevered from each of the spacer members by being mounted on top of each of the spacer members at bottom of each of the mirror layers at the first portion thereof.

4. The actuated mirror array of claim 1, wherein each of the actuating structures is of a bimorph structure and includes a first electrode, a second electrode, an intermediate metal layer, an upper motion-inducing thin film layer and a lower motion-inducing thin film layer, wherein the upper and lower motion-inducing thin film layers are separated by the intermediate metal layer, the first electrode is placed on top of the upper motion-inducing thin film layer and the second electrode is placed at bottom of the lower motion-inducing thin film layer.

5. The actuated mirror array of claim 4, wherein the upper and lower motion-inducing thin film layers are made of a piezoelectric material.

6. The actuated mirror array of claim 5, wherein the piezoelectric material of the upper motion-inducing thin film layer is poled in a direction opposite that of the lower motion-inducing thin film layer.

7. The actuated mirror array of claim 1, wherein the motion-inducing thin film layer is made of a piezoelectric ceramic or a piezoelectric polymer.

8. The actuated mirror array of claim 7, wherein the motion-inducing thin film layer is poled.

9. The actuated mirror array of claim 1, wherein the motion-inducing thin film layer it made of an electrostrictive material.

10. The actuated mirror array of claim 1, wherein the first and second electrodes cover completely the top and bottom of the motion-inducing thin film layer, respectively.

11. The actuated mirror array of claim 1 further comprises M×N elastic layers, each of the elastic layers being placed on either top or bottom of each of the actuating structures.

12. The actuated mirror array of claim 1, wherein the array of M×N spacer members is absent therefrom.

13. The actuated mirror array of claim 12, wherein each of the supporting layers is simultaneously connected to the distal end of each of the actuating structures and the top surface of the the substrate.

14. The actuated mirror array of claim 1, wherein each of the supporting members includes a conduit for electrically connecting the second electrode in each of the actuating structures with the corresponding connecting terminal.

15. The actuated mirror array of claim 1, wherein each of the spacer members is located at top of the distal end, of each of the actuating structures.

16. The actuated mirror array of claim 1, wherein each of the mirror layers further includes a mirror base layer between the corresponding mirror layer and the spacer member.

17. A method for manufacturing an array of M×N thin film actuated mirrors for use in an optical projection system, the array including an array of M×N actuating structures, an array of M×N spacer members, an array of M×N mirror layers, an array of M×N supporting members and an active matrix including a substrate and an array of M×N connecting terminals formed on top of the substrate, wherein M and N are integers, the method comprising the steps of:

(a) forming a supporting layer on top of the active matrix, the first supporting layer including the array of M×N supporting members and a first sacrificial area each, of the supporting members including a conduit;

(b) depositing a first thin film electrode, a thin film motion-inducing and a thin film second electrode layers successively, on top of the first supporting layer;

(c) providing a spacer layer on top of the second thin film electrode layer, the spacer layer including the array of M×N spacer members and a second sacrificial area;

(d) depositing a light reflecting layer on top of the spacer layer to thereby form a semifinished actuated mirror structure;

(e) patterning the semifinished actuated mirror structure into an array of M×N semifinished actuated mirrors; and (f) removing the first and second sacrificial areas of the first supporting layer and the spacer layer in each of the semifinished actuated mirrors to thereby form said array of M×N thin actuated mirrors.

18. The method of claim 17, wherein the first and second thin film electrode layers are formed using a sputtering method.

19. The method of claim 17, wherein the thin film motion-inducing layer is formed using a sputtering method.

20. The method of claim 17, wherein the thin film motion-inducing layer is formed using a chemical vapor deposition method.

21. The method of claim 17, wherein the thin film motion-inducing layer is formed using a sol-gel method.

22. The method of claim 17, wherein the light reflecting layer is formed using a sputtering method.

23. The method of claim 17, wherein the supporting members are formed by:

(a) depositing a first sacrificial layer on top of the active matrix;

(b) providing an array of M×N first empty slots on the sacrificial layer, each of the first empty slots being located around each of the M×N connecting terminals;

(c) forming a pedestal in each of the first empty slots; and (d) forming a conduit in each of the pedestals, the conduit extending from top of the pedestal to the connecting terminal.

24. The method of claim 23, wherein the first sacrificial layer is formed using a sputtering method.

25. The method of claim 23, wherein the array of M×N first empty slots is formed using an etching method.

26. The method of claim 23, wherein the pedestals are formed using a sputtering method, followed by an etching method.

27. The method of claim 23, wherein the pedestals are formed using a chemical vapor deposition method, followed by an etching method.

28. The method of claim 17, wherein the spacer layer is formed by:

(a) depositing a second sacrificial layer on the second thin film electrode layer;

(b) providing an array of M×N empty slots on the second sacrificial layer; and (c) forming a spacer member in each of the empty slots.

29. The method of claim 28, wherein the second sacrificial layer is formed using a sputtering method.

30. The method of claim 28, wherein the array of M×N empty slots is formed using an etching method.

31. The method of claim 28, wherein the spacer member is formed using a sputtering method, followed by an etching method.

32. The method of claim 28, wherein the spacer member is formed using a chemical vapor deposition method, followed by an etching method.

33. The method of claim 17, which further includes a step of the deposition of a mirror base layer on top of the spacer layer after the formation of the spacer layer.

34. A method for manufacturing an array of M×N thin film actuated mirrors for use in an optical projection system, the array including an array of M×N actuating structures an array of M×N spacer members, an array of M×N mirror layers, an array of M×N supporting members and an active matrix including a substrate and an array of M×N connecting terminals formed on top of the substrate, wherein M and N are integers, the method comprising the steps of:

(a) forming a supporting layer on top of the active matrix, the supporting layer including an array of M×N supporting members and a sacrificial area;

(b) depositing a first thin film electrode, a thin film motion-inducing and an intermediate metal, an upper thin film motion-inducing and a second thin film electrode layers, successively, on top of the supporting layer;

(c) providing a spacer layer on top of the second thin film electrode layer, the spacer layer including the array of M×N spacer members and a second sacrificial area;

(d) depositing a light reflecting layer on top of the spacer layer to thereby form a semifinished actuated mirror structure;

(e) patterning the semifinished actuated mirror structure into an array of M×N semifinished actuated mirrors; and (f) removing the first and second sacrificial areas of the first supporting layer and the spacer layer in each of the semifinished actuated mirrors to thereby form said array of M×N thin actuated mirrors.

35. The method of claim 34, which further includes a step of the deposition of a mirror base layer on top of the spacer layer after the formation of the spacer layer.

* * * * *